United States Patent [19]

Ishihara et al.

[11] Patent Number: 4,992,928

[45] Date of Patent: Feb. 12, 1991

[54] MULTIPLE ERROR PROCESSOR IN AUTOMATIC WORK HANDLING APPARATUS

[75] Inventors: Akira Ishihara; Matsuro Kinbara; Kazuhiro Noda; Kenji Nonomura, all of Osaka, Japan

[73] Assignee: Nitto Denko Corporation, Osaka, Japan

[21] Appl. No.: 292,969

[22] Filed: Jan. 3, 1989

[30] Foreign Application Priority Data

Feb. 8, 1988 [JP] Japan .................................. 63-26760

[51] Int. Cl.$^5$ .......................... G05B 11/01; G05B 9/02; G05B 23/02; G06F 11/00
[52] U.S. Cl. ..................................... 364/183; 364/184; 364/187; 318/565; 371/7; 371/9.1
[58] Field of Search ............... 364/183, 184, 185, 186, 364/187, 131–136, 140, 141, 142, 474.11, 474.16; 371/1–29; 318/565–568

[56] References Cited

U.S. PATENT DOCUMENTS

| | | | |
|---|---|---|---|
| 4,377,000 | 3/1983 | Staab | 364/184 |
| 4,500,951 | 2/1985 | Sugimoto et al. | 364/186 |
| 4,521,847 | 6/1985 | Ziehm et al. | 364/132 |
| 4,592,053 | 5/1986 | Matsuura | 364/184 |
| 4,638,227 | 1/1987 | Katayama et al. | 364/184 |
| 4,740,887 | 4/1988 | Rutenberg | 364/184 |
| 4,748,553 | 5/1988 | Itoh et al. | 364/184 |
| 4,858,102 | 8/1989 | Lovrenich | 364/136 |

Primary Examiner—Jerry Smith
Assistant Examiner—Jim Trammell
Attorney, Agent, or Firm—Sughrue, Mion, Zinn, Macpeak & Seas

[57] ABSTRACT

A multiple error processor in an automatic work handling apparatus includes controlling a number of operating mechanisms individually by the operation of control devices corresponding thereto. The operating mechanisms are controlled to stop for errors arising thereon according to stop mode data which corresponds to the errors. The operating mechanisms are controlled to restart-up according to restart-up data corresponding to a first generated error and also for ensuing errors occurring after the first error and before all of the operating mechanisms come to a stop. The errors are stored in an error code memory in an error recovery device.

5 Claims, 4 Drawing Sheets

| ERROR CODE | STOP MODES | $a_1$ | $a_2$ | $a_3$ | $a_4$ | $a_5$ | $a_6$ | ... | $a_{N-5}$ | $a_{N-4}$ | $a_{N-3}$ | $a_{N-2}$ | $a_{N-1}$ | $a_N$ |
|---|---|---|---|---|---|---|---|---|---|---|---|---|---|---|
| 1 | INSTANT STOP | | ○ | | | | | | | | | | | |
| 1 | FIXED POINT STOP | ○ | | | | | | | | | | | | |
| 1 | CLEAR OUT STOP | | | ○ | ○ | ○ | ○ | | | | | ○ | ○ | ○ |
| 2 | INSTANT STOP | | | | ○ | | | | | | | | | |
| 2 | FIXED POINT STOP | ○ | ○ | ○ | | | | | | | | | | |
| 2 | CLEAR OUT STOP | | | | ○ | ○ | ○ | | ○ | ○ | ○ | ○ | ○ | ○ |
| STOP MODE DATA CREATED NEWLY FROM ERROR CODES 1 AND 2 | INSTANT STOP | | ○ | | ○ | | | | | | | | | |
| STOP MODE DATA CREATED NEWLY FROM ERROR CODES 1 AND 2 | FIXED POINT STOP | ○ | | ○ | | | | | | | | | | |
| STOP MODE DATA CREATED NEWLY FROM ERROR CODES 1 AND 2 | CLEAR OUT STOP | | | | | ○ | ○ | | ○ | ○ | ○ | ○ | ○ | ○ |

MULTIPLE ERROR PROCESSOR IN AUTOMATIC WORK HANDLING APPARATUS

FIELD OF THE INVENTION

The present invention relates to an automatic work handling apparatus which comprises controlling each of a plurality of operating mechanisms disposed successively along a direction in which a work is transferred by operation controlling means corresponding to each of the operating mechanisms, and is particularly concerned with an error processor for use on such an apparatus as is necessary to have each work controlled in an Factory Automation line.

BACKGROUND OF THE INVENTION

In a prior art automatic work handling apparatus, the construction is such that the operating mechanism on which an error arises is stopped instantaneously, an operating mechanism disposed upstream from the erroneously operating mechanism is stopped at a fixed point, and an operating mechanism disposed downstream from the erroneously operating mechanism is stopped for clear out.

Meanwhile, a fairly long time will be required for each operating mechanism to stop completely, and hence an error is capable of arising on another operating mechanism (i.e. an operating mechanism other than the detected erroneously operating mechanism) before the stop operation of all of the operating mechanisms is completed. In such a case, multiple errors takes place, and the prior art apparatus comes to a stop instantaneously.

In the case in which an error arises on a first operating mechanism, and an error further arises on another operating mechanism while the operating mechanisms are being stopped for reset, the prior art apparatus comes to a stop instantaneously as mentioned above, and therefore all of the operating mechanisms will be returned to home positions, and a work must be reset for restart-up of the apparatus, and thus a problem occurs in that a large amount of time will be required before the restart-up.

SUMMARY OF THE INVENTION

The present invention is provided in view of the circumstances mentioned above, and therefore it is an object of the invention to reduce the time and labor required for recovery of a normal operation from an occurrence of an ensuing error when such multiple errors have arisen.

To attain the aforementioned object, the invention takes the following construction.

That is, a multiple error processor in an automatic work handling apparatus of the invention comprises:

a plurality of operating mechanisms disposed successively along the direction in which a work is transferred;

a plurality of operation controlling means, each of which being associated with a different one of the operating mechanisms for controlling each of the operating mechanisms individually, and for setting and sending an error code when an error arises, an operation sequence indicating means for controlling the sequence of operation of each operating mechanism through each of the operation controlling means;

an apparatus control means for controlling the work handling apparatus;

an error detection means for detecting an error arising on each operating mechanism, and for transferring the control of the apparatus from the apparatus control means to an error recovery means upon detection of an error, and also for supplying the error code received from the operation controlling means;

an error code storage means constituting a part of the error recovery means, which receives an error code supplied from the error detection means and which stores the received error code:

a stop data table constituting a part of the error recovery means, which stores beforehand stop mode data for each operating mechanism according to an error code;

a post-error stop means constituting a part of the error recovery means, which receives an error code from the error detection means reads a corresponding stop mode data from the stop data table according to the received error code and sends the read stop mode data to each of the operation controlling means through the operation sequence indicating means so that the operation mechanisms are controlled according to the read out stop mode data;

a controlled state storage means constituting a part of the error recovery means, for storing control data representing the state of each operating mechanism after each operating mechanism is stopped by the post error stop means;

a post-stop operating data table constituting a part of the error recovery means, which stores beforehand error post-stop operation mode data of each operating mechanism according to an error code;

an error post-stop operating means constituting a part of the error recovery means, which reads the error post-stop operation mode data from the post-stop operating data table after each of the operating mechanisms is stopped, and sends the read error post-stop operation mode data to each operation controlling means through the operation sequence indicating means;

a restart-up data table constituting a part of the error recovery means which stores beforehand restart-up mode data of each operating mechanism according to an error code;

a restart-up data setting means constituting a part of the error recovery means, which reads the restart-up mode data from the restart-up data table and the control data from the controlled state storage means according to the error code stored in the error code storage means, creates restart-up data from the read restart-up mode data and the read control data, and sends the restart-up data to each operation controlling means through the operation sequence indicating means; wherein, the error code storage means stores the error code for a first detected error of the operation control means, and also stores an ensuing error code when an ensuing error arises after the detection of the first error but before all the operating mechanisms come to a stop;

the stop data table has stop mode data for stopping the erroneously operating mechanisms instantaneously, stopping those non-erroneously operating mechanisms disposed upstream from the erroneously operating mechanism at a fixed point, and stopping according to a clear out mode of operation, those operating mechanisms disposed downstream from the erroneously operating mechanism;

the error post-stop means creates new stop mode data for stopping each operating mechanism on which an error has arisen instantaneously, stopping those operating mechanisms in which no error has arisen and which are disposed upstream.from the most downstream erroneously operating mechanism at a fixed point and stopping according to a clear out mode of operation those operating mechanisms disposed downstream from the most upstream erroneously operating mechanism according to the first error code and the ensuing error code where the ensuing error code is generated after the first error code but before all of the operating mechanisms come to a stop;

the error post-stop operation means carry out, in sequence, error post-stop operations according to all of the stored error codes after all of the operating mechanisms come to a stop; and the restart-up data setting means sets restart-up data according to all of the stored error codes after the error post-stop operations are completed.

In the above-mentioned construction of the invention, "stopping instantaneously" refers to stopping the operating mechanism (on the spot), that is, the instant an error arises, "stopping at a fixed point" refers to carrying out handling after an error arises and stopping the operating mechanism at the point in time when the handling is completed, or stopping generally at the point in time when the next sensor detects a completion of the handling.

The term "stopping to clear out" refers to continuing a handling until the whole process of the predetermined handling process in each operating mechanism is completed (i.e., after an error arises, and stopping individual operating mechanisms at the point in time when the handling of the whole process in each operating mechanism is completed). More particularly, in the case where the operating mechanism is stopped according to the clear out mode of operation and there is more than one operating mechanism to be stopped according to the clear out operation, then it is a mode of stop wherein the handling of all the operating mechanisms comes to completion or to a stop (i.e., a mode of stop where all works are cleared out of the last operating mechanism).

A function according to the construction of the invention is as follows.

Other than the error code generated for the first erroneous operating mechanism, the error code storage means stores an error code for an error generated thereafter, the post-error stop means creates new stop mode data for stopping each operating mechanism on which an error has arisen instantaneously, stopping the operating mechanism(s) disposed upstream from the most upstream erroneously operating mechanism of a plurality of erroneously operating mechanisms, at a fixed point, and also for stopping to clear out that/those operating mechanism(s) disposed downstream from the most downstream erroneously operating mechanism according to the first detected error code and the ensuing error code, and therefore an overall error recovery is realized for multiple errors.

Accordingly, unlike the prior art apparatus, the apparatus according to the present invention will never entirely be stopped instantaneously, and thus the time and labor required before the apparatus is restarted up can be reduced.

BRIEF DESCRIPTION OF THE DRAWINGS

FIGS. 1-3 relate to a mode of operation of the invention, wherein

DETAILED DESCRIPTION OF PREFERRED EMBODIMENT

The invention will now be described in detail with reference to the accompanying drawings which represent a preferred embodiment thereof.

Figure 1:
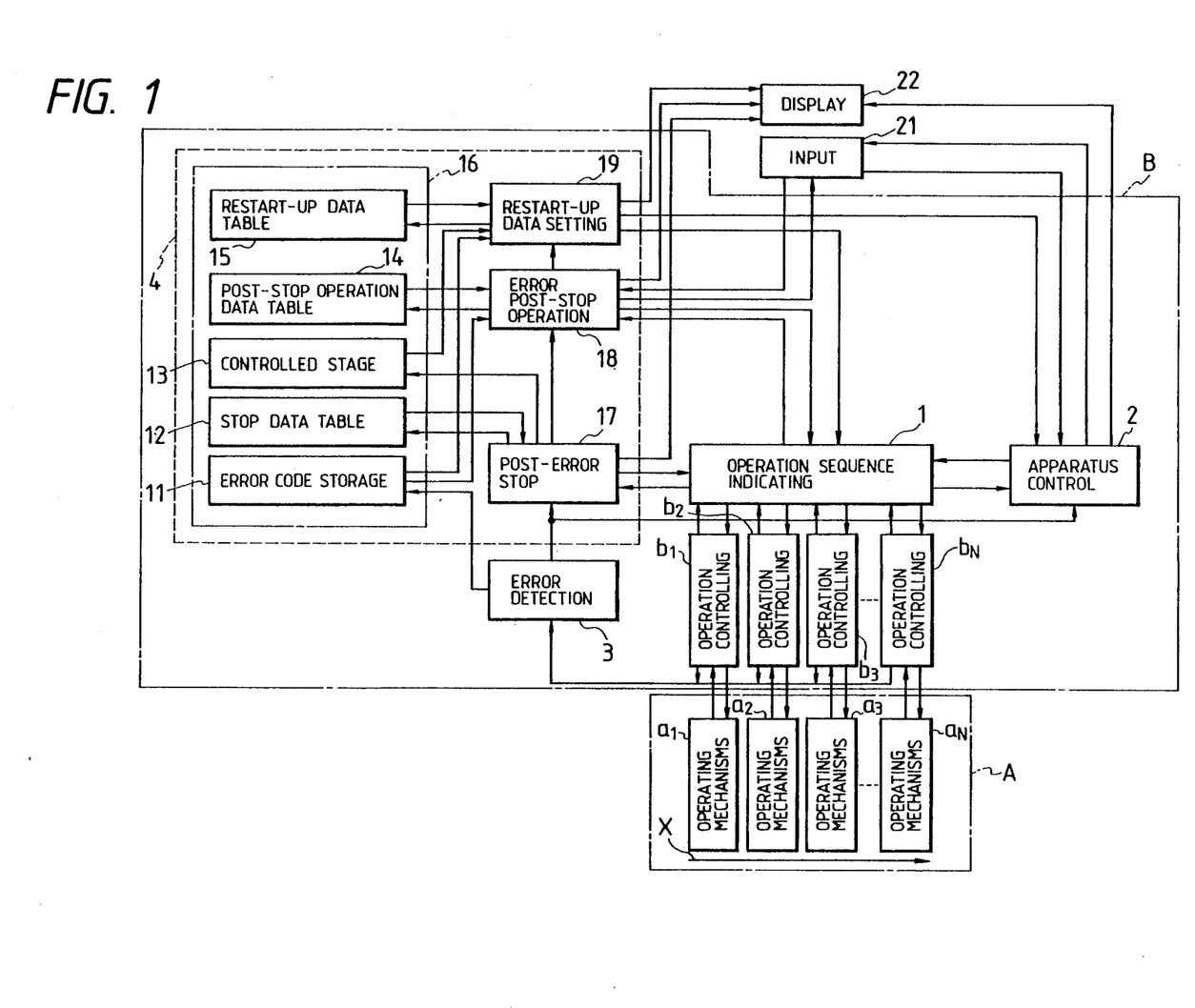
FIG. 1 is a block diagram representing a construction of a multiple error processor in an automatic work handling apparatus according to the present invention.

FIG. 1 is a block diagram representing a construction of a multiple error processor in the automatic work handling apparatus of the present invention.

An operating mechanism part A is constituted of a plurality of operating mechanisms $a_1$, $a_2$, $a_3$ . . . , $a_n$ arrayed in sequence along the direction X in which a work (not indicated) is transferred Each of the operating mechanisms $a_1$, $a_2$, $a_3$, . . . $a_n$, takes particular charge of a definite operation individually when a general operation of the operating mechanism part A is divided into a plurality of definite operations.

Each of the operating mechanisms $a_1$, $a_2$, $a_3$, . . . $a_n$, takes particular charge of a definite indicated) and also a plurality of sensors (not indicated). However, the operating mechanism may have a single actuator and/or sensor.

A control part B is a portion constituted of a microcomputer, comprising a plurality of operation controlling means $b_1$, $b_2$, $b_3$, . . . , $b_n$ for $a_3$ . . . , $a_n$ individually, an operation sequence indicating means 1 for indicating a sequence of control operations of the operation controlling means $b_1$, $b_2$, $b_3$, . . . , $b_n$ to the operating mechanisms $a_1$, $a_2$, $a_3$, . . . , $a_n$, an apparatus for control means 2 for controlling the automatic work handling apparatus entirely, an error detection means 3 for detecting various errors generated on the operating mechanisms $a_1$, $a_2$, $a_3$, . . . , $a_n$ and for transferring a control of the automatic work handling apparatus from the apparatus control means 2 to an error recovery means 4.

Each of the operation controlling means $b_1$, $b_2$, $b_3$, . . . , $b_n$ functions to drive the actuators in the corresponding operating mechanism $a_1$, $a_2$, $a_3$, . . . , $a_n$ according to a command from the operation sequence indicating means 1, to detect an operating state of the actuators on the sensors, to transfer the detection result to the operation sequence indicating means 1, to set a predetermined error code according to the kind of error arising, if any, on the corresponding operating mechanisms $a_1$, $a_2$, $a_3$, . . . , $a_n$, and to transfer the error code to the error detection means 3.

The error recovery means 4 includes a memory 16 comprising an error code storage means 11 for storing error codes supplied from the error detection means 3, a stop data table 12 storing beforehand a stop mode data for each of the operating mechanisms $a_1$, $a_2$, $a_3$, $a_n$ according to the error code, a controlled state storage means 13 for storing sideways, control data on all the operating mechanisms $a_1$, $a_2$, $a_3$, . . . , $a_n$ after error generation and stop, a post-stop operating data table 14 for storing beforehand operation mode data (for example, data for returning an erroneously operating mechanism to a home position or to a predetermined position and so forth) for each of the operating mechanisms $a_1, a_2, a_3, \ldots, a_n$ after error generation and stop according to the error code, and a restart-up data table 15 for storing beforehand restart-up mode data (for example, data indicating which step of the sequence operation to start from and so forth) for each of the operating mechanisms $a_1, a_2, a_3, \ldots, a_n$ after error recovery according to the error code.

Other than the memory 16, the error recovery means 4 also includes a post-error stop means 17 for reading a stop mode data according to the error code received from the error detection means 3 with reference to the data table 12 after error generation, thus controlling a stop of each of the operating mechanisms $a_1, a_2, a_3, \ldots, a_n$, an error post-stop operation means 18 for reading an error post-stop operation mode data according to the error code read from the error code storage means 11 with reference to the post-stop operating data table after error stop thus controlling operations (for example, an operation for returning an erroneously operating mechanism to a home position or to a predetermined position and so forth) of each of the operating mechanisms $a_1, a_2, a_3, \ldots, a_n$ after stop, and a restart-up data setting means 19 for reading a control data stored sideways in the controlled state storage means 13, reading a restart-up mode data according to the error code stored beforehand in the restart-up data table 15 according to the error code received from the error code storage means 11 and setting a restart-up data from the control data and the restart-up mode data.

A reference numeral 21 denotes an input means such as keyboard or the like which is manipulated by an operator, 22 denotes a display part for notifying an operator of error information by a light emitting diode or the like, both the input means 21 and the display 22 are connected to the control part B.

The error detection means 3 functions to receive the error code from an operation controlling means $b_{er1}$ corresponding to an operating mechanism $a_{er1}$ on which an error arises first, transferring a control of the automatic work handling apparatus from the apparatus control means 2 to the error recovery means 4 as described hereinbefore, and functions to transmit the error code to the post-error stop means 17 and to the error code storage means 11 in the error recovery means 4.

As will be described hereinafter, all the operating mechanisms $a_1, a_2, a_3, \ldots, a_n$ are stopped correspondingly to the error generated first, the error detection means 3 further functions to receive the ensuing error code from a corresponding operation controlling means $b_{er2}$ when an error arises on another operating mechanism $a_{er2}$ before the stop operations come to completion, and then to transmit the ensuing error code to the post-error stop means 17 and to the error code storage means 11.

The error code storage means 11 stores not only the error code on the first detected error but also the ensuing error code.

The stop data table 12 has a content wherein an erroneously operating mechanism $a_{er}$ is stopped instantaneously according to the error code, the operating mechanism (which may be a single operating mechanism or a plural number of operating mechanisms) other than the operating mechanism $a_{er}$ which is positioned upstream of the operating mechanism $a_{er}$ in the work transfer direction X is stopped at a fixed point, and an operating mechanism (which also may be a single or a plural number of operating mechanisms) positioned downstream of the operating mechanism $a_{er}$ is stopped for clear out.

The post-error stop means 17 functions to receive an error code from the error detection means 3, read data on which mode to stop each of the operating mechanisms $a_1, a_2, a_3, \ldots, a_n$ with reference to the stop data table 12 according to the error code, and to transmit the stop mode data to each of the operation controlling means $b_1, b_2, b_3, \ldots, b_n$ through the operation sequence indicating means 1.

When all of the operating mechanisms $a_1, a_2, a_3, \ldots, a_n$ are stopped either instantaneously, at a fixed point or to clear out, as discussed above, the post-error stop means 17 also functions to receive the stop signals through the operation sequence indicating means 1, and to store sideways the control data of the automatic work handling apparatus in the controlled state storage means 13.

The control data in storage means 13 indicates how far the program has gone and then stops.

The post-error stop means 17 functions to transfer the state wherein all the operating mechanisms $a_1$ to $a_n$ have stopped to the error post-stop operation means 18 and to the display part 22.

In the case wherein an error arises on another operating mechanism a stage prior to the stop of all of the operating mechanisms $a_1, a_2, a_3, \ldots, a_n$ due to the first error, the post-error stop means 17 resets a new stop mode data for stopping the erroneously operating mechanisms $a_{er1}, a_{er2}$ instantaneously, stopping operating mechanisms (except the operating mechanisms $a_{er1}, a_{er2}$) disposed upstream of the most downstream erroneously operating mechanism of those operating mechanisms $a_{er1}, a_{er2}$ (i.e.. FIG. 1 shows that $a_2$, is more downstream than $a_1$) at a fixed point, and stopping, according to a clear out operation those operating mechanisms disposed downstream from the most downstream erroneously operating mechanism according to the preceding error code and the ensuing error code.

The error post-stop operation means 18 functions to transfer a reset command through the operation sequence indicating means 1 only to the operation controlling means $b_{er}$ corresponding to the operating mechanism $a_{er}$ which has stopped instantaneously according to the error code on a reset input from the input means 21 after all of the operating mechanisms $a_1, a_2, a_3, \ldots, a_n$ due to an error generation come to a stop completely, to receive the signal indicating that a reset operation has been completed from the operation sequence indicating means 1 to transfer the aforementioned signal to the display part 22 and also to transfer the error post-stop operation to the restart-up data setting means 19.

Where an error arises on more than one operating mechanism, the error post-stop operation means 18 controls all of the error-arisen (erroneously operating) mechanisms $a_{er1}, a_{er2}$ in sequence:

The restart-up data setting means 19 functions to create and set a restart-up data indicating from which step of the sequence operation to restart up each of the operating mechanisms $a_1, a_2, a_3, \ldots, a_n$ according to the restart-up mode data read from the restart-up data table 15 according to the error code read from the error code storage means 11 as described, and the control data read from the controlled state storage means 13 also according to the same error code, sending the set restart-up data to each of the operating mechanisms $a_1, a_2, a_3, \ldots, a_n$ through the operation sequence indicating means 1 and each of the operation controlling means $b_1, b_2, b_3, \ldots$ ..., $b_n$, transferring a signal indicating a completion of the error recovery process to the display part 22, and transferring a controlled state of the automatic work handling apparatus from the error recovery means 4 to the apparatus control means 2.

Further, when an error arises on more than one operating mechanism, the restart-up data setting means 19 reads the restart-up mode data and the control data from the restart-up data table 15 and the controlled state storage means 13 respectively on all the error codes stored in the error code storage means 11, and creates and sets the restart-up data thereon.

Figure 2A:
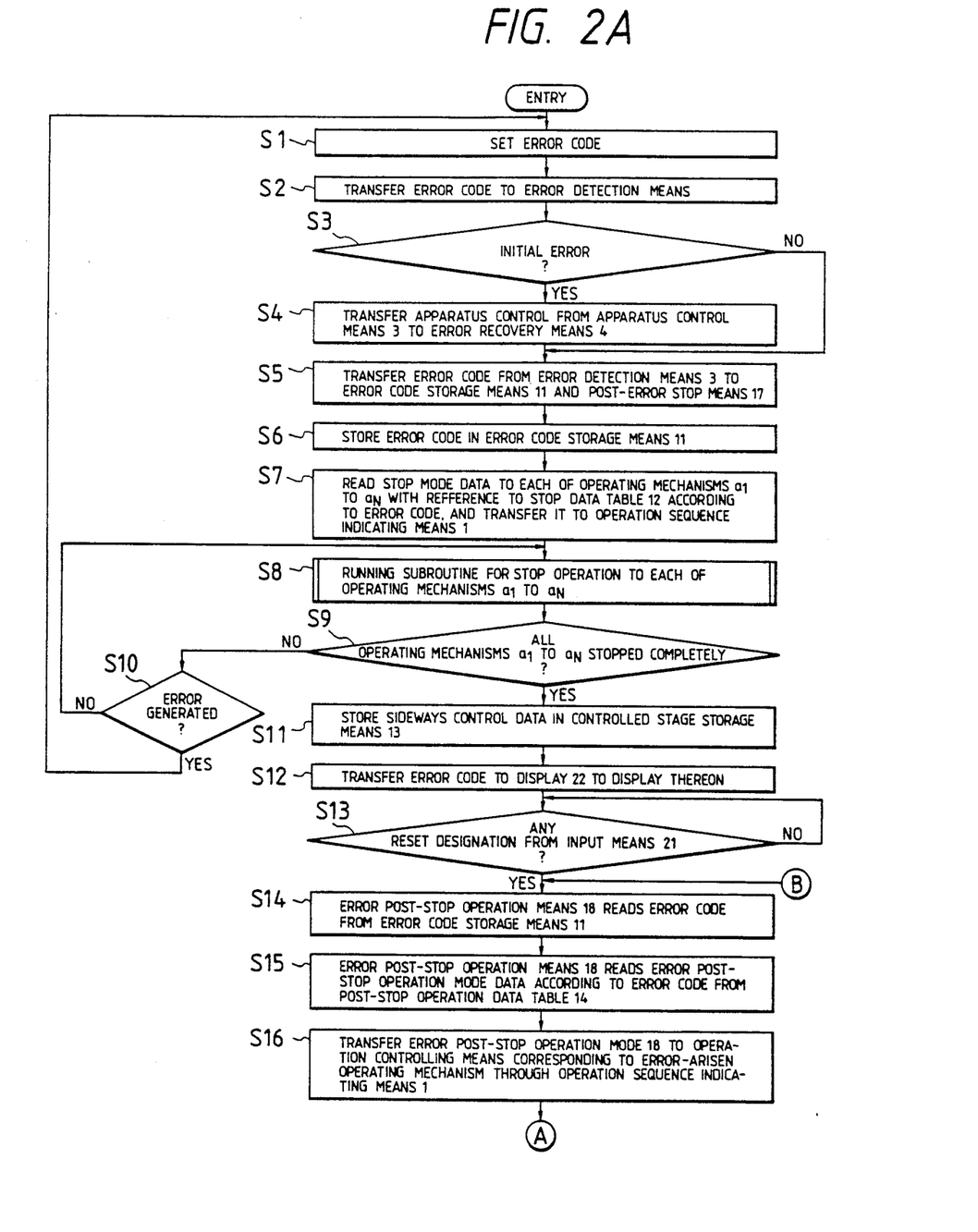
FIGS. 2A and 2B is a single flowchart for illustrating the operation of the apparatus of FIG. 1.
Figure 2B:
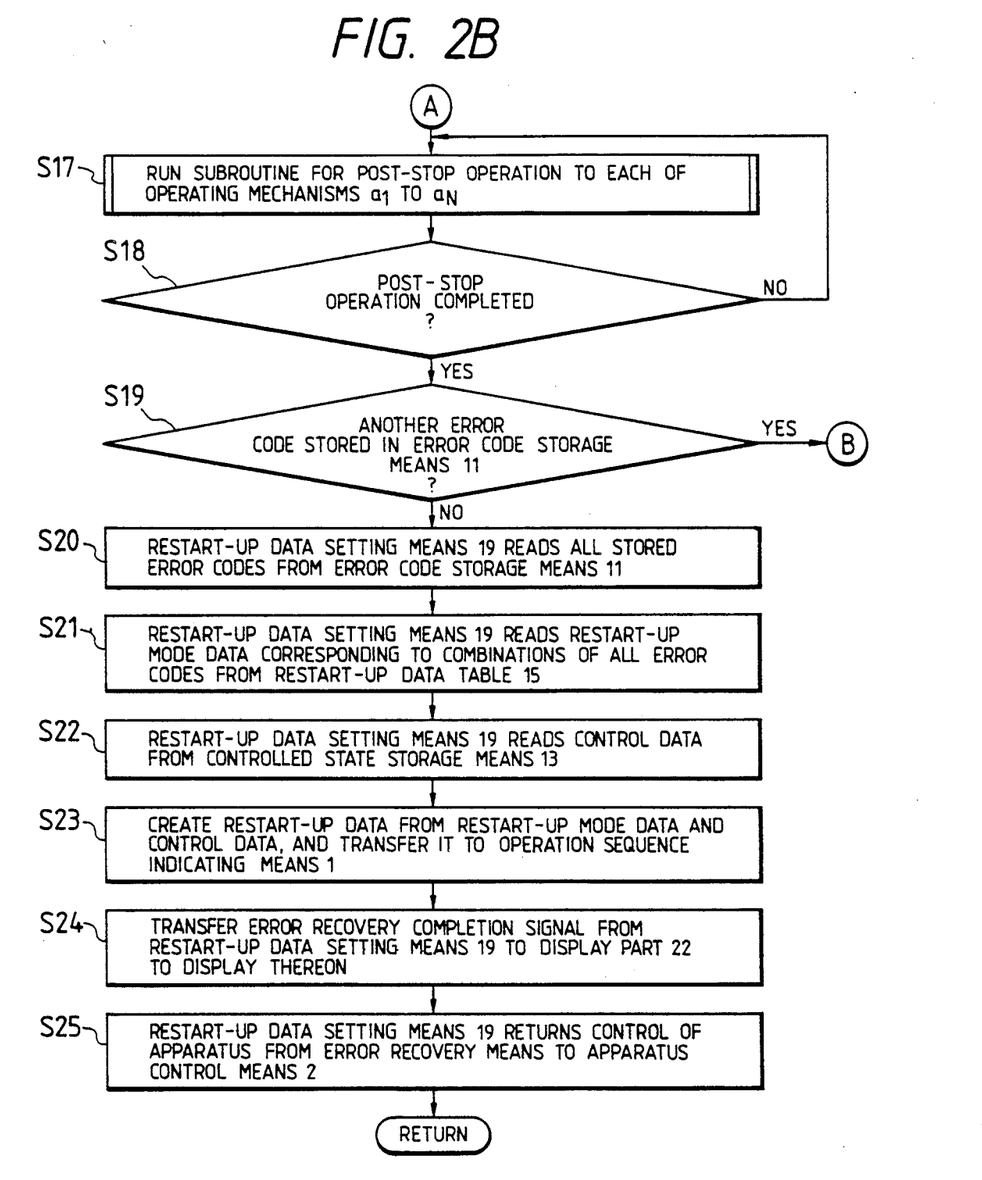

Next, an operation of the multiple error processor in an automatic work handling apparatus of the embodiment will be described with reference to a flowchart shown in FIGS. 2A and 2B.

Now, let it be assumed that a work flows in a plurality of operating mechanisms $a_1, a_2, a_3, \ldots, a_n$ in that order along the direction X in which the work is transferred, and individual works positioned on each of the operating mechanisms $a_1, a_2, a_3, \ldots, a_n$ are subjected to a predetermined handling each to a normal operation.

In such a state wherein an error arises on an operating mechanism $a_{er1}$ of those operating mechanisms $a_1, a_2, a_3, \ldots, a_n$, the error is detected by the operation controlling means $b_{er1}$ corresponding to the operating mechanism $a_{er1}$, and an operation from STEP S1 of interruption routine for error detection is started.

The operation controlling means $b_{er1}$ sets an error code according to the error detected in STEP S1, and the error code is transferred to the error detection means 3 at STEP S2.

Upon receipt of the error code, the error detection means 3 decides whether or not the error is a first one at STEP S3 and if so, then the process goes forward to STEP S4, where a control of the automatic work handling apparatus is transferred from the apparatus control means 2 to the error recovery means 4. In STEP S5 the error code is transmitted from the error detection means 3 to the error code storage means 11 and to the post-error stop means 17. In STEP S6 the error code is stored in the error code storage means 11.

In STEP S7 the post-error stop means 17 reads a stop mode data for each of the operating mechanisms $a_1, a_2, a_3, \ldots, a_n$ with reference to the stop data table 12 according to the error code, and transfers the stop mode data to the operation sequence indicating means 1.

In a subroutine of STEP S8 a stop operation is commanded from the operation sequence indicating means 1 to each of the operating mechanisms $a_1, a_2, a_3, \ldots, a_n$ through each of the operation controlling means $b_1, b_2, b_3, \ldots, b_n$.

Figure 3:
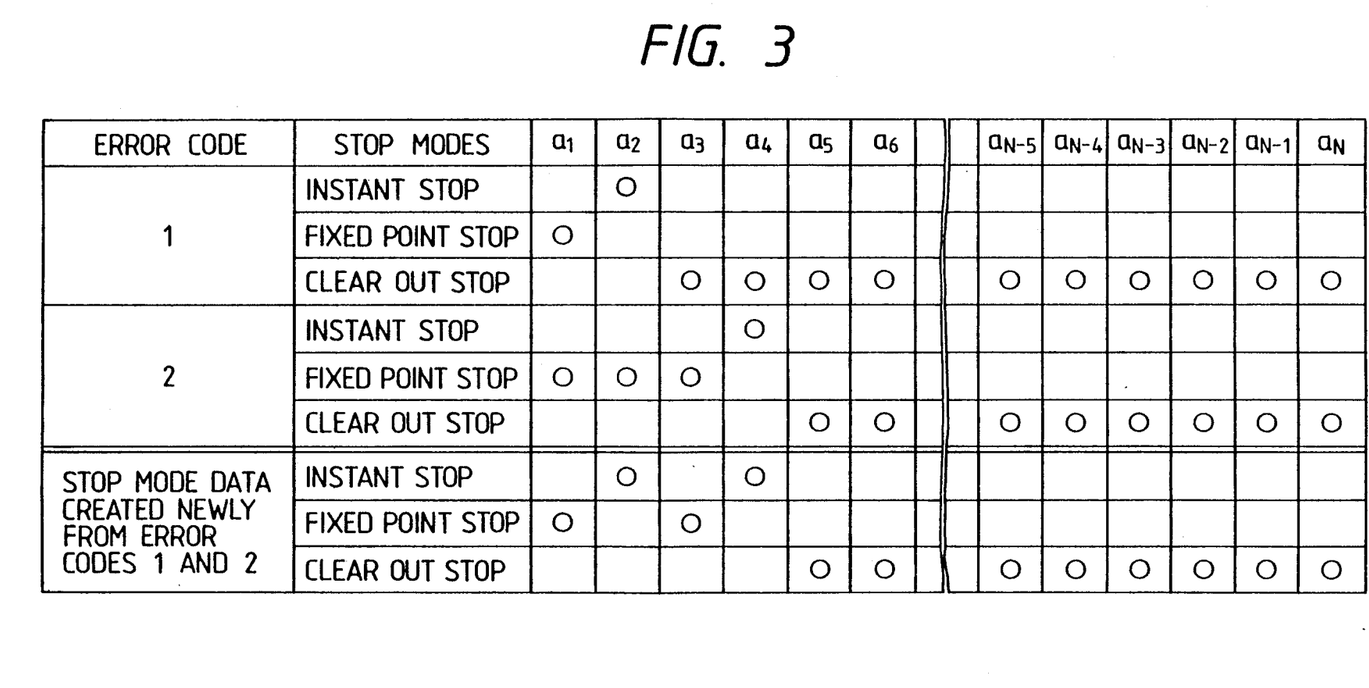
FIG. 3 is a drawing depicting the stop data table.

In FIG. 3, if the error code is "1", for example then the error-arisen operating mechanisms $a_2 = a_{er1}$, and the operating mechanism $a_1$ is present on the upper side thereof or upstream of the mechanism $a_2$, and the operating mechanisms $a_3, \ldots, a_n$ are present on the lower side or downstream from mechanism $a_2$.

In such a case, the operating mechanism $a_2 = a_{er1}$ is stopped instantaneously, the upper operating mechanism $a_1$ is stopped at a fixed point, and the lower operating mechanisms $a_3, \ldots, a_n$ are stopped to clear out.

For stopping at a fixed point, when a work in the operating mechanism $a_1$ is kept at starting point of the operating mechanism $a_1$ at the time of error generation, the handling is stopped immediately to stop the work at the starting point (fixed point) however, when the work is positioned halfway of the operating mechanism $a_1$ at the time of error generation, the handling is kept going continuously and when the work reaches the next sensor in the operating mechanism $a_1$, the handling on the operating mechanism $a_1$ is stopped to stop the work at the sensor position (fixed point).

For stopping to clear out, when a predetermined handling on each of the lower operating mechanisms $a_1, a_2, a_3, \ldots, a_n$ is completed, a work on the operating mechanism $a_3$ is sent to the operating mechanism $a_4$, a work on the operating mechanism $a_4$ is sent to the operating mechanism $a_5$, a work on the operating mechanism $a_{n-1}$ is sent to the operating mechanism $a_n$, and a work on the last operating mechanism $a_n$ is cleared out from a last outlet. Whenever the work is sent out, the operating mechanism $a_3$ comes to stop. Works are sent successively likewise, and the operating mechanisms $a_4, a_5, \ldots$ stop in that order. When all works are cleared out finally through the last operating mechanism $a_n$, the last operating mechanism $a_n$ is stopped.

Then in the next STEP S9, a check is made on whether or not a signal indicating a stop of each of the operating mechanisms $a_1, a_2, a_3, \ldots, a_n$ has been transferred from all the operating mechanisms $a_1, a_2, a_3, \ldots, a_n$ to the post-errorstop means 17 through each of the operation controlling means $b_1, b_2, b_3, \ldots, b_n$ and the operation sequence indicating means 1, and if all of the mechanisms are stopped, then the process goes forward to the next STEP S11.

However, in the stage of waiting for the mechanisms to stop as discussed above the process goes through STEP S10 to decide whether or not an error has arisen on any operating mechanism of the operating mechanisms $a_1, a_2, a_3, \ldots, a_n$ (except the error-arisen operating mechanism $a_2 = a_{er1}$).

Then, where an error is detected again, the process returns to STEP S1. STEPS S2, S5 and S6 remain the same as described above, however in STEP S7, a stop mode data coordinating with the error generated theretofore and the newly generated data is created.

As shown in FIG. 3, for example, in the case wherein an error with the error code "2" is generated on the operating mechanism $a_4 = a_{er2}$ after an error with the error code "1" was generated on the operating mechanism $a_2 = a_{er1}$, the post-error stop means 17 creates and sets the following stop mode data on the preceding error code and the ensuing error code.

The new stop mode data comprises stopping both the operating mechanisms $a_2, a_4$ instantaneously, stopping at a fixed point the operating mechanisms $a_1, a_3$ disposed on the upstream side of the operating mechanism $a_4$ (which is the most downstream erroneously operating mechanism of the two erroneously operating mechanisms) and stopping to clear out the operating mechanisms $a_5$ to $a_n$ on the lower side or downstream of the operating mechanism $a_4$ (the most downstream erroneously operating mechanism).

The post-error stop means 17 transfers the stop mode data newly created to each of the operation controlling means $b_1, b_2, b_3, \ldots, b_n$ through the operation sequence indicating means 1. STEPS S8 to S10 remain the same as described hereinabove.

In STEP S11 the post-error stop means 17 stores the control data sideways in the controlled state storage means 13, and in STEP S12 the post-error stop means 17 transfers the error code to the display part 22 to display thereon.

In STEP S13 a reset designation from the input means 21 by manipulation of an operator is awaited, in STEP S14 the error post-stop operation means 18 reads an error code (the error code "1" on the operating mechanism a=$a_{er1}$, first) from the error code storage means 11, in STEP S15 the error post-stop operation means 18 reads the error post-stop operation mode data (for example, a reset designation to the error-arisen operating mechanism $a_{er1}$) corresponding to the error code from the post-stop operating data table 14, in STEP S16 the error post-stop operation means 18 transfers the error post-stop operation mode data to the operation controlling means ($b_2=b_{er1}$, first) corresponding to the error-arisen operating mechanism through the operation sequence indicating means 1, next in the subroutine of STEP S17, the error-arisen operating mechanism is subjected to a post-stop operation (or, for example, the operating mechanism $a_2=a_{er1}$ is reset, and the actuator is returned to a home position.)

When the post-stop operation is completed, the completion signal is transferred to the error post-stop operation means 18 through the operation sequence indicating means 1. In STEP S18 whether or not the post-stop operation is completed is ensured, and if so ensured, then the process goes forward to STEP S19, where whether or not another error code (the error code "2" in the case of FIG. 3) is stored in the error code storage means 11 is decided, and if stored then the process returns to STEP S14 to run STEPS S14 to S19.

In the case of FIG. 3, in STEP S14 the error code "2" on the operating mechanism $a_4=a_{er2}$ is read, in STEP S15 an error post-stop operation mode data corresponding to the error code "2" is read, in STEP S16 the error post-stop operation mode data is transferred to the operation controlling means $b_4=b_{er2}$, and then in STEP S17 the operating mechanism $a_4=a_{er2}$ of an ensuing error is subjected to a post-stop operation (reset operation). In STEP S18 a completion of the post-stop operation is ensured, in STEP S19 whether or not another error code is stored in the error code storage means 11 is again decided, however since the other error code is not present in the case of FIG. 3, the process goes forward to STEP S20.

In STEP S20 the restart-up data setting means 19 reads all stored error codes from the error code storage means 11, in STEP S21 the restart-up data setting means 19 reads the restart-up mode data corresponding to a combination of the error codes "1" and "2" from the restart-up data table 15, in STEP S22 the restart-up data setting means 19 reads a control data from the controlled state storage means 13, in STEP 23 a restart-up data is created from the restart-up mode data and the control data, which is transferred to the operation sequence indicating means 1.

That is, in case an operating mechanism having stopped at a fixed point is present, a stop at the point in time when the operating mechanism stopped at the fixed point of a sequence operation of the operating mechanism is reset on the corresponding operation controlling means. Then, in case an operating mechanism having stopped to clear out is present, a step at the point in time when the operating mechanism stopped at an end point of a sequence operation of the operating mechanism is reset on the corresponding operation controlling means.

Then, for operating mechanisms ($a_2=a_{er1}$ and $a_4=a_{er2}$ in the case of FIG. 3) having stopped instantaneously and subjected to a post-stop operation at STEP S17, the operation controlling means ($b_2=b_{er1}$ and $b_4=b_{er2}$) are returned to the start step of a sequence operation necessary for restarting up the operating mechanisms.

The error recovery process has now been completed, and thus an error recovery completion signal is transferred from the restart-up data setting means 19 to the display part 22 in STEP S24, the display part 22 displays to that effect to inform an operator thereof, the restart-up data setting means 19 returns a control of the apparatus from the error recovery means 4 to the apparatus control means 2 in STEP S25, and then the process returns to the main routine.

When the operator observes the display part 22 to operate a start switch of the input means 21, a retry is commenced by the apparatus control means 2 to a normal operation.

Then, in the case of FIG. 3, the operating mechanism on which an ensuing error arises is positioned on a lower side of the operating mechanism on which a first error arose, however, a similar process is carried out where it is positioned on an upper side reversed thereto.

For example, let it be assumed that an error arises on the operating mechanism $a_6$ first and then another error arises on the operating mechanism $a_3$ next, then both the operating mechanisms $a_3$, $a_6$ would be stopped instantaneously, the operating mechanisms $a_1$, $a_2$, $a_4$, $a_5$ would be stopped at fixed points, and the operating mechanisms $a_7$ to $a_n$ are stopped to clear out.

Further, if errors arose on the three operating mechanisms $a_4$, $a_7$ $a_9$, then these mechanisms would be stopped instantaneously, the operating mechanisms $a_1$ to $a_3$, $a_5$, $a_6$, $a_8$ would be stopped at fixed points, and the operating mechanisms $a_{10}$ to $a_n$ would be stopped to clear out.

As described above, where errors arise, an error code on the error generated first and also an error code on the error generated thereafter are stored, and thus the error recovery process determined beforehand is carried out on each error. The apparatus will never be stopped entirely instantaneously unlike the prior art apparatus, therefore the time for restarting up the apparatus can be reduced.

According to the invention, the following effects can be obtained.

If an error arises and another error also arises on a single or plural operating mechanism before all operating mechanisms come to a stop, the erroneously operating mechanisms are stopped instantaneously, therefore the apparatus will be secured, and an operating mechanism disposed upstream of the erroneously operating mechanism (the lowermost error-arisen operating mechanism when plural errors arise) is stopped at a fixed point, an operating mechanism disposed downstream is stopped according to a clear out operation, therefore the apparatus is ready for restarting after error generation, and error codes corresponding to all of the errors generated are stored, and thus a recovery process can be effected against each error. The apparatus will never be stopped entirely instantaneously unlike the prior art apparatus, and therefore the time and labor required before restart-up of the apparatus can be sharply reduced.

What is claimed is:

1. A multiple error processor in an automatic work handling apparatus, comprising;
   a plurality of operating mechanisms disposed successively along a direction in which a work is transferred;
   a plurality of operation controlling means for controlling each of the operating mechanisms individually, and for setting and sending an error code when an error arises:

an operation sequence indicating means for controlling the sequence of operation of said operating mechanisms through said operation controlling means:

an apparatus control means for controlling the automatic work handling apparatus;

an error detection means for detecting an error arising on each of said operating mechanisms, and for transferring a control of the apparatus from said apparatus control means to an error recovery means upon detection of an error, and for outputting the error code received from said operation controlling means;

an error code storage means constituting a part of said error recovery means, which receives a first error code from said error detection means and stores the first error code;

a stop data table constituting a part of said error recovery means, which stores stop mode data for each of said operating mechanisms according to an error code;

a post-error stop means constituting a part of said error recovery means, which receives an error code from said error detection means, reads a corresponding stop mode data from said stop data table according to the received error code and sends the read stop mode data to each operation controlling means through said operation sequence indicating means, thereby controlling the stop mode of each of said operating controlling means according to the read stop mode data;

a controlled state storage means constituting a part of said error recovery means, which stores a control data on each operating mechanism after each operating mechanism is stopped by said post-error stop means;

a post-stop operating data table constituting a part of said error recovery means, which stores beforehand an error post-stop operation mode data of each operating mechanism according to an error code;

an error post-stop operation means constituting a part of said error recovery means, which reads the error post-stop operation mode data from said post-stop operating table after each of said operating mechanisms is stopped and which sends the error post-stop operation mode data to each operation controlling means through said operation sequence indicating means;

a restart-up data table constituting a part of said error recovery means, which stores beforehand a restart-up mode data of each operating mechanism according to an error code;

a restart-up data setting means constituting a part of said error recovery means, which reads the restart-up mode data from said restart-up data table, reads the control data from said controlled state storage means, creates a restart-up data from said restart-up mode data and the control data, and sends the restart-up data to each operation controlling means through said operation sequence indicating means; wherein, said error code storage means stores a first error code from said error detection means, and also stores an ensuing error code when another error is supplied from said error detection means, the ensuing error code being detected by said error detection means after the first error code but before all the operating mechanisms come to a stop;

said stop data table having a stop mode data which represents stopping an erroneously operating mechanism instantaneously, which represents stopping an operating mechanism disposed upstream relative to the work transfer direction from the erroneously operating mechanism at a fixed point and which represents stopping according to a clear out operation an operating mechanism disposed downstream from said erroneously operating mechanism;

said post-error stop means being operable for creating a new stop mode data representing stopping each of the erroneously operating mechanisms instantaneously, representing stopping an operating mechanism disposed upstream from the most downstream erroneously operating mechanism at a fixed point, and representing stopping according to a clear out operation an operating mechanism disposed downstream from the most downstream erroneously operating mechanism according to the first error code and the ensuing error code;

said error post-stop operating means being operable for carrying out, in sequence, error post-stop operations according to each of the stored error codes after all of the operating mechanisms come to a stop;

said restart-up data setting means being operable for setting restart-up data according to all of the stored error codes after the error post-stop operations are completed.

2. A multiple error processor in an automatic work handling apparatus, comprising;

a plurality of operating mechanisms disposed successively along a direction in which a work is transferred;

a plurality of operation controlling means for controlling each of the operating mechanisms individually and for setting and outputting an error code when an error arises in said operation controlling means:

error detection means for detecting a first error code from any one of said operation controlling means;

error recovery means for receiving the detected first error code from said error detection means, said error recovery means having memory means for storing stop mode data for each of said operation controlling means according to an error code;

post error stop means for receiving the detected first error code from said error detection means and for reading first stop mode data from said memory means according to said detected first error code;

operation sequence means, coupled to said error recovery means and to said plurality of operation controlling means, for controlling the stop operation of said operating mechanisms according to stop mode data supplied from said post error stop means;

said error detecting means being operable for detecting a second error code from one of said operation controlling means other than that operation controlling means which caused the first error code, the second error code being generated after the first error code and before said operating mechanisms are stopped by said operation sequence means;

said post error stop means being operable for generating second stop mode data based on said first and second detected error codes, and for supplying the second stop mode data to said operating sequence means, thereby controlling the stop operation of said operating mechanisms according to the second stop mode data, said second stop mode data representing information for instantaneously stopping each of the erroneously operating mechanisms, for stopping all of the properly operating mechanisms which are disposed upstream of the most downstream erroneously operating mechanism at a fixed position, and for stopping all of the properly operating mechanisms disposed downstream from the most downstream erroneously operating mechanism according to a clear out mode of operation.

3. The multiple error processor according to claim 2, wherein said error recovery means further comprises error code storage means for storing error codes from said error detection means, a post-stop operating table having data stored therein according to an error code and representing the operation of said operation control means after said operating mechanisms are stopped, and error post-stop operating means for reading said data stored in said post-stop operating table according to said error codes stored in said error code storage means, and for supplying said read data from said post-stop operating table to said operation sequence means, thereby controlling said operating mechanisms according to the read out data from said post-stop operating table after said operating mechanisms are stopped.

4. The multiple error processor according to claim 2, wherein said error recovery means further comprises error code storage means for storing error codes from said error detection means, controlled state storage means for storing control data corresponding to said operating mechanisms after error generation and after all of the operating mechanisms are stopped, and restart data table means for storing restart-up data for each of said operating mechanisms according to error codes, and restart-up setting means for reading data stored in said controlled state storage means and in said restart data table means according to the error codes stored in said error code storage means, and for supplying said read data from said restart data table means to said operation sequence means, thereby controlling the restart-up of said operating mechanisms after said operating mechanisms are stopped according to the data stored in said restart data table means.

5. The multiple error processor according to claim 2, further comprising control means for controlling the automatic work handling apparatus, and wherein said post error stop means is operable for transferring control of the automatic work handling apparatus from said control means to said error recovery means when said error detection means detects an error code.

* * * * *